United States Patent [19]

Knowles

[11] Patent Number: 4,960,985
[45] Date of Patent: * Oct. 2, 1990

[54] COMPACT OMNIDIRECTIONAL LASER SCANNER

[75] Inventor: Carl H. Knowles, Moorestown, N.J.

[73] Assignee: Metrologic Instruments, Inc., Bellmawr, N.J.

[*] Notice: The portion of the term of this patent subsequent to Dec. 15, 2004 has been disclaimed.

[21] Appl. No.: 413,141

[22] Filed: Sep. 27, 1989

Related U.S. Application Data

[63] Continuation of Ser. No. 938,931, Dec. 8, 1986, abandoned, which is a continuation-in-part of Ser. No. 800,486, Nov. 21, 1985, Pat. No. 4,713,532.

[51] Int. Cl.$^5$ .............................................. G06K 7/10
[52] U.S. Cl. .................................. 235/467; 235/454; 235/470; 350/6.1; 350/6.5; 350/6.8
[58] Field of Search ............... 235/454, 462, 463, 467, 235/470; 350/6.1, 6.2, 6.5, 6.7, 6.8

[56] References Cited

U.S. PATENT DOCUMENTS 4,713,532 12/1987 Knowles .............................. 235/467

Primary Examiner—A. D. Pellinen
Assistant Examiner—Jeffrey A. Gaffin
Attorney, Agent, or Firm—Caesar, Rivise, Bernstein, Cohen & Pokotilow

[57] ABSTRACT

A compact laser scanner for use at a counter, such as a checkout counter, to produce a scanning pattern thereabove and into which a bar code can be inserted to enable the reading of the code. A scanner is of compact height and preferably comprises a housing of a height no greater than approximately six inches and taking up an area of no greater than 150 square inches. The housing includes a top having a window through which the scanning pattern is projected and indicia for directing the location of the bar code within the scanning pattern. The scanning pattern consists of three scan lines which intersect one another in a common area to produce a star-burst pattern when projected on a plane at approximately 45° to the plane of the window, while intersecting in approximately a triangular configuration when projected on a plane approximately perpendicular to the window. The scanner includes a laser tube, a rotating polygonal reflecting member and plural beam folding mirrors all disposed within the housing. The polygonal reflecting member is arranged to be mounted about a vertical axis. The laser tube is mounted laterally of the polygonal reflecting member and provides a substantially focused beam thereon. The rotation of the reflecting member causes the beam to sweep across the reflecting surfaces, which surfaces fold the beam and direct it out through the window to create the pattern. All sides of the scanner including its side walls, end walls, top and bottom walls are planar. This feature, and the compactness and light weight of the scanner enable the scanner to be positioned on any of its walls, above or below the counter, with the plane of the window at any angle with respect to the plane of the counter.

8 Claims, 5 Drawing Sheets

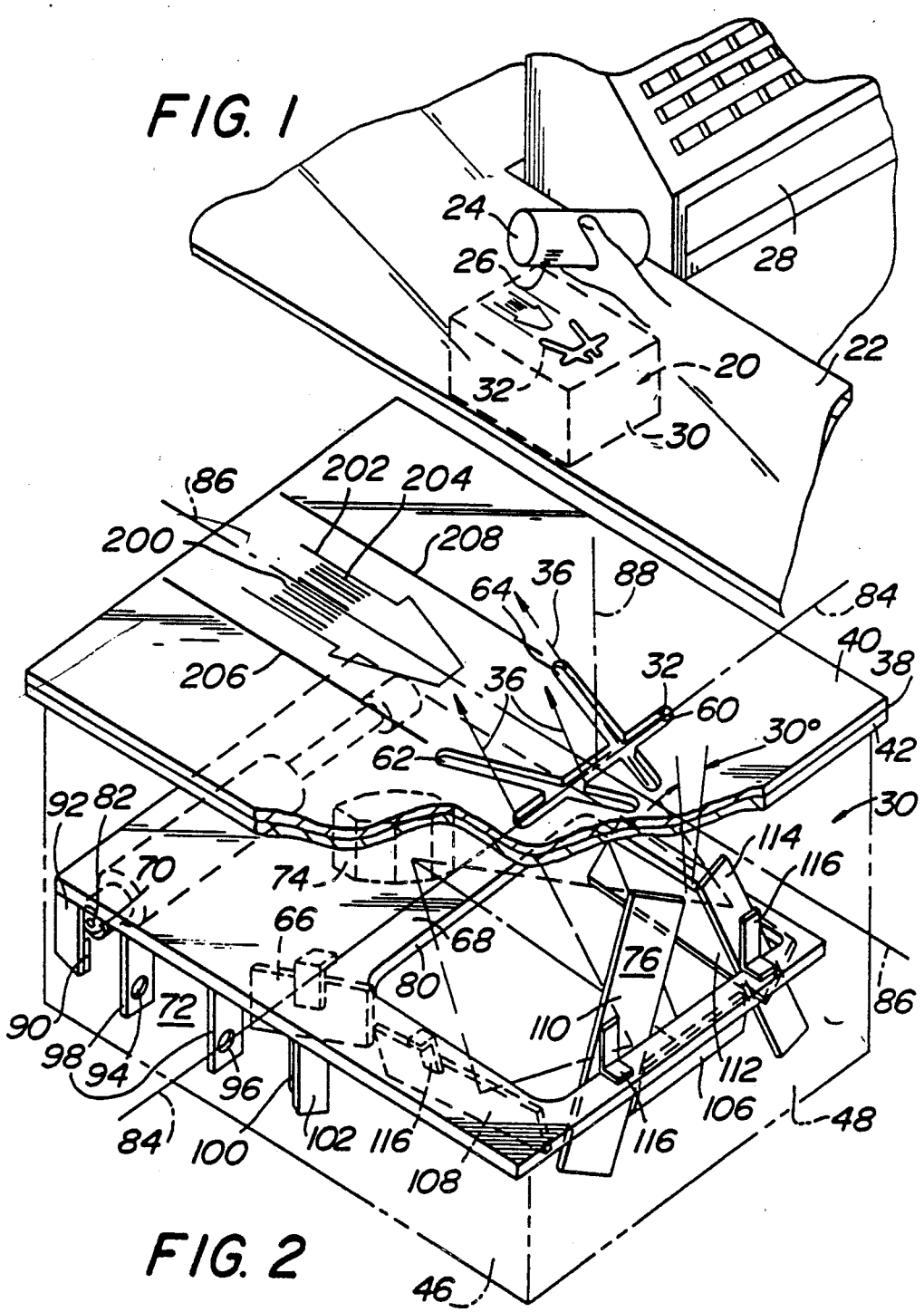

COMPACT OMNIDIRECTIONAL LASER SCANNER

This application is a continuation application of pending prior application, Application Ser. No. 06/938,931, entitled COMPACT OMNIDIRECTIONAL LASER SCANNER, now abandoned, filed on Dec. 8, 1986, which was a continuation-in-part application of prior Application Ser. No. 06/800,486 filed on Nov. 21, 1985 now U.S. Pat. No. 4,713,532. The disclosures of continuation-in-part Application Ser. No. 06/938,931 and the prior Application Ser. No. 06/800,486 are incorporated by reference herein.

BACKGROUND OF THE INVENTION

This invention relates generally to laser devices and more particularly to laser scanning apparatus.

Laser scanning apparatus for use at checkout counters in supermarkets and other retail establishments are gaining wider and wider acceptance. Such devices are generally mounted within the counter and have a window at the top thereof through which a scanning pattern is projected. The scanning pattern is created by a laser and associated optical components which produce plural scan lines which intersect in various patterns. A bar code, such as the Uniform Product Code, which is imprinted on the packaging of a product is then brought into the field of the scan pattern so that the scan pattern traverses the bar code. Light reflected off the bar code is received back through the window of the scanning device by optical means and associated decoding means to provide signals indicative of the bar code. These signals can be utilized to identify the article bearing the code and provide pricing information.

In order to ensure that there are sufficient lines in the pattern to ensure that all of the bar code is traversed, thereby ensuring that the code is read accurately, prior art devices have utilized various optical configurations including mirrors, prisms, and the like to fold the beam and create complex patterns, such as comb patterns, orthogonal patterns, interlaced patterns, star-like patterns, etc.

For example, in U.S. Pat. No. 3,902,048 (Fleisher et al.) there is disclosed an omnidirectional laser bar-code scanner for use in check-out counters. That device creates a plurality of interlaced scan lines extending in differing directions. The means for producing that pattern consists of a laser which projects a beam of light onto a multifaceted mirror which is rotated about a horizontal axis to deflect the light beam vertically into a mirror tunnel assembly disposed thereabove.

In U.S. Pat. No. 3,928,759 (Sansome) there is disclosed a laser scanner for omnidirectional reading of bar codes. The pattern consists of a longitudinally extending line and a set of lines perpendicular thereto to create a comb-like pattern. The pattern is created by use of a laser tube which projects a beam of light into a beam splitter. One of the beams is projected via angled mirrors to a horizontally rotating multifaceted mirror to produce the horizontal line of the pattern. The other beam is projected off an angularly mounted rotating mirror to cause the beam to sweep axially along the multifaceted mirror to produce the plural perpendicularly extending lines of the pattern.

In U.S. Pat. No. 4,006,343 (Izura et al.) there is disclosed a laser scanner for projecting an x-shaped or intersecting scanning pattern through a corresponding shaped window on a check-out counter. The pattern is created by splitting a laser beam, produced by a horizontally disposed laser tube, into two beams. One beam is projected into a first angled deflecting mirror which rotates about a first horizontal axis to cause the beam to project upward to sweep across the window in one direction. The other beam is projected into a second angled deflecting mirror, which rotates about another horizontal axis but perpendicular to the first axis, to project the beam upward and to sweep it across the window perpendicularly to the first sweep.

While the foregoing patented devices, as well as commercially available omnidirectional laser scanners, may be generally suitable for their intended purposes, such devices have been necessarily large and bulky. Accordingly, such devices necessarily project a considerable distance below the top of the counter while also taking up a substantial portion of the space below the counter.

OBJECTS OF THE INVENTION

Accordingly, it is the general object of the instant invention to provide a compact, omnidirectional laser scanner which overcomes the deficiencies of the prior art.

It is a further object of the instant invention to provide a compact, omnidirectional laser scanner which creates a scanning pattern having a sufficiently large sweet spot into which a bar code can be placed to enable the full decoding thereof, irrespective of its orientation.

It is still a further object of the instant invention to provide a compact, omnidirectional laser scanner which is suitable for under counter applications, while still providing sufficient room for the legs of operating personnel to fit thereunder when seated.

It is still a further object of this invention to provide a compact omnidirection laser scanner utilizing a relatively high power laser, while remaining within predetermined radiation limits, by virtue of the type of scanning pattern produced thereby.

It is still a further object to the instant invention to provide a compact, omnidirectional laser scanner which is simple in construction and relatively low in cost.

It is yet a further object of the instant invention to provide a compact, omnidirectional laser scanner which can be mounted in various orientations, e.g., horizontally, vertically, etc., with respect to a counter or other support structure.

SUMMARY OF THE INVENTION

These and other objects of the instant invention are achieved by providing a compact laser scanner for use at a counter to produce an intersecting line scanning pattern thereabove and into which a bar code can be inserted to enable reading of the bar code. The scanner basically comprises a housing having a small height (e.g., no greater than six inches) and which takes up a small area of the counter (e.g., no greater than 150 square inches). The housing has horizontal, transverse and longitudinal axes. The housing also includes a top having a window through which the scanning pattern is projected. The scanner basically comprises a laser beam generating means, beam sweeping means for cyclically sweeping the beam in the housing, and reflecting means, all disposed within the housing The beam sweeping means and the reflecting means are oriented so that for each sweep of the beam in the housing, the reflecting means projects the intersecting line scanning pattern out of the window. The housing is regularly shaped to enable it to be positioned with respect to the counter so that the window is in a plane orthogonal or parallel to the counter.

DESCRIPTION OF THE DRAWING

Other objects and many of the attendant advantages of this invention will be readily appreciated as the same becomes better understood by reference to the following detailed description when considered in connection with the accompanying drawing wherein:

FIG. 1 is a perspective view of a typical check-out counter at a store which utilizes the laser scanner apparatus of the subject invention;

FIG. 2 is an enlarged perspective view, partially in section, of the laser scanner shown in FIG. 1;

DETAILED DESCRIPTION OF THE PREFERRED EMBODIMENT

Figure 3:
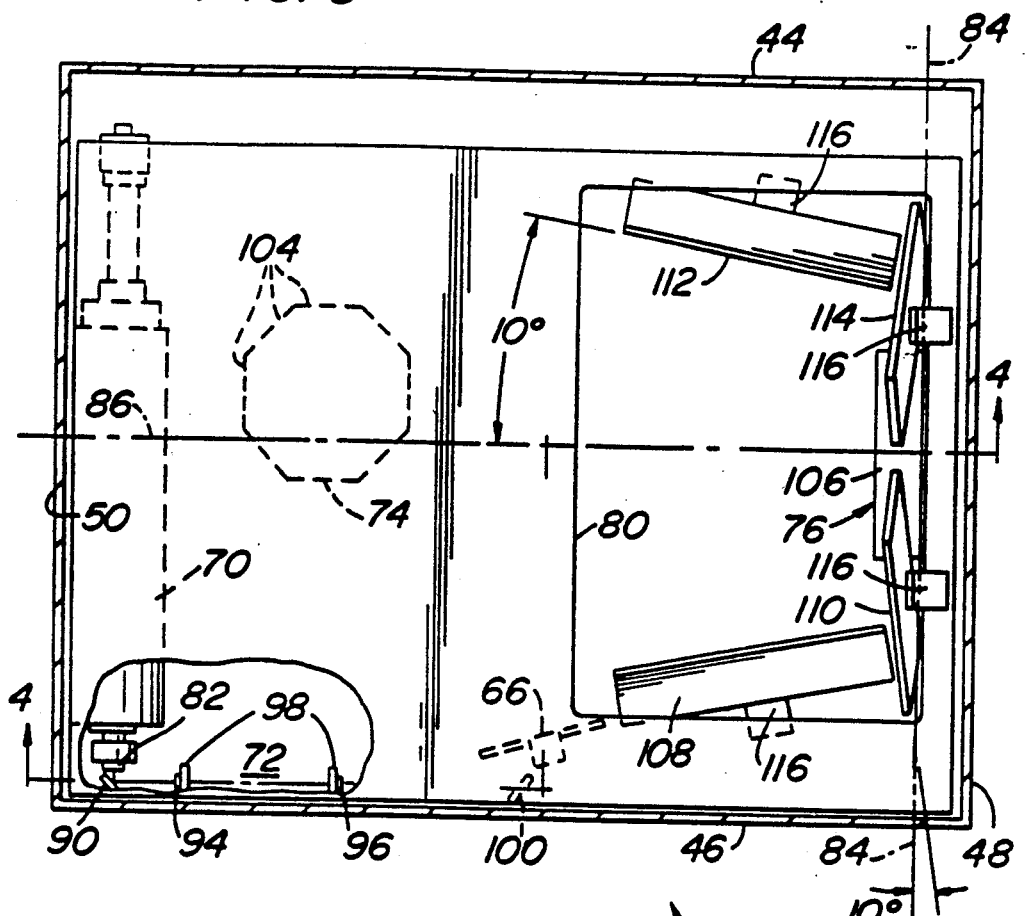
FIG. 3 is a top elevational view, partially in section, of the laser scanner shown in FIG. 2.

Referring now in greater detail to the various figures of the drawing wherein like reference characters refer to like parts, there is shown generally at 20 in FIG. 1 a laser scanner constructed in accordance with the subject invention. Scanner 20 is mounted under the counter, such as a checkout counter of a store, to project a scanning pattern like that shown in FIGS. 5-7, through a window in the counter and into the space thereabove. An article, such as a food container 24, having a conventional bar code 26, such as the UPC code, printed thereon is brought into the scanning pattern by the check-out clerk, to enable the pattern to sweep across the code, whereupon light reflected off the bar code is received back by components of the scanner which process and decode the bar code bearing signal, as is conventional.

The scanning pattern of the subject invention is particularly effective in creating a "sweet spot" of large area and depth with sufficient scan lines therein to ensure that the lines sweep across the entire bar code 26 to enable the proper reading or decoding thereof, by conventional decoding means (not shown) located within the scanner 20. The decoding means is utilized to provide signals indicative of the decoded symbol to peripheral equipment, such as a conventional electronic cash register 28, etc.

As will be described hereinafter, the scanner 20 is disposed within a housing 30 which is extremely compact. In particular, the height or depth of the housing (i.e., vertical dimension) is sufficiently short, e.g., six inches or less, to enable the device to be mounted under the counter, 22 while still leaving sufficient space therebelow to enable the check-out clerk to sit with his or her knees under the housing The feature is of considerable importance for applications in European countries where laws require that counter check-out personnel be seated. In addition to the short height or depth of the housing 30, it also only takes up a small area of the available counter space. Thus, the area or "footprint" of the housing 30 is less than 150 square inches and preferably under 120 square inches.

Before describing the details of the construction of the scanner 20, the scanning pattern produced thereby will be described. That pattern is shown clearly in FIGS. 5-7 and is produced within the scanner housing 30 and projected thereout through a horizontally disposed window 32. The window 32 is located on the counter and will be described in detail later. Suffice it now to state that the window's shape is such that it enables the scan lines produced by the device 20 to pass therethrough to form the scan pattern 34 shown in FIGS. 5-7. Moreover, the window 32 is generally oriented so as to be in a plane parallel to the countertop, that is, the horizontal plane.

Figure 5:
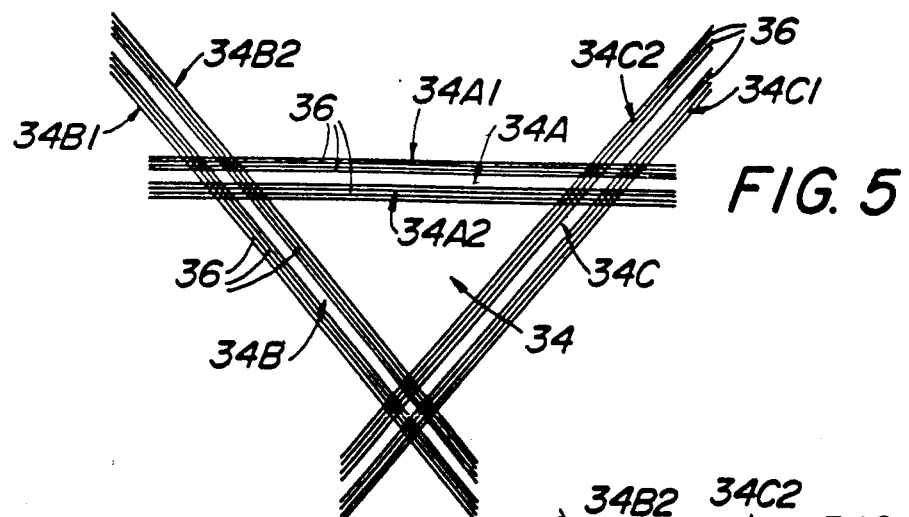
FIGS. 5, 6 and 7 are plan views of the scanning pattern produced by the scanner of FIG. 1 when projected on a plane and at an angle of 90°, 45° and 0°, respectively, to the window of the scanner.
Figure 6:
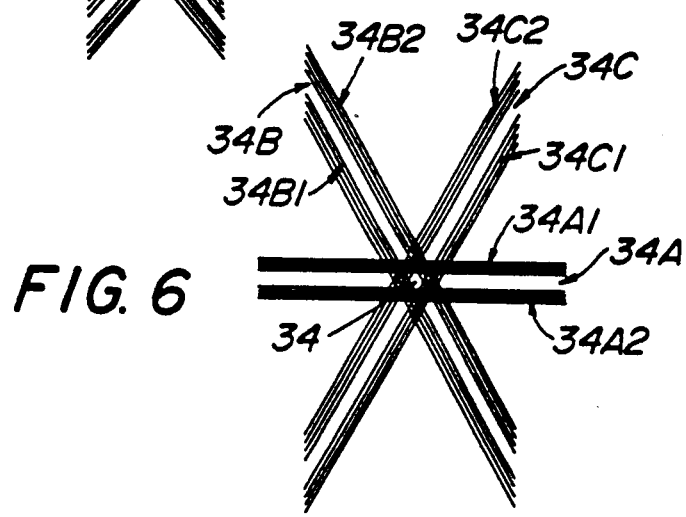
Figure 7:
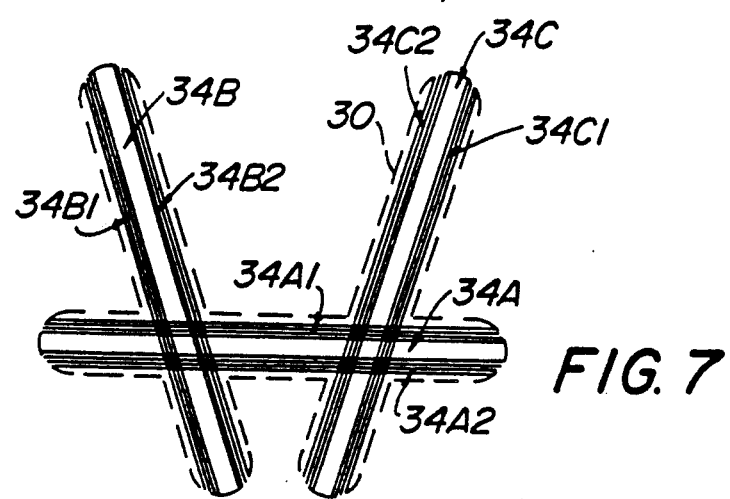

The scanning pattern produced by the device 20 is of a fixed or pre-established configuration, but such a configuration appears differently, depending upon the surface upon which it is projected. To that end, in FIG. 6 the scanning pattern is shown when projected on a surface approximately 45° to the plane of the window 32. This 45° orientation is typical of an angle at which a bar code to be scanned is held over the window 32 by the check-out clerk. In FIG. 5 the pattern is shown when projected in a plane approximately 90° to the plane of the window, while FIG. 7 shows the pattern when projected on a plane parallel to the window.

The scanning pattern produces only three scan lines during each cycle of operation, that is for each sweep of the laser beam in the housing. However, the means which effects the sweeping of the laser beam consists of a polygonal rotating element having plural reflecting surfaces. As a result of normal fabrication tolerances, those surfaces are slightly skewed with respect to one another. Thus, the scan pattern which is produced by each reflecting surface during a single sweep will be slightly skewed with respect to the pattern produced by the preceding surface, thereby producing, over time, a scan pattern appearing to contain plural groups of intersecting scan lines. In particular, the scanning pattern 34 produced over a period of time, i.e., consisting of several sweeps, basically consists of three groups, 34A, 34B and 34C, of plural, individual scan lines 36. The scan lines in each group are paired. Each group 34A, 34B, and 34C consists of at least one pair of scan lines which are disposed parallel to one another, but spaced at a minimum distance (to be described later).

As will also be described in detail later one preferred means for sweeping the laser beam to create the scan lines 36 making up the groups comprises a multifaceted polygon arranged for rotation about a vertical axis. Each face of the polygon is reflective, with one group of faces being skewed in the same direction and at generally the same small acute angle with respect to another group of faces and to the vertical axes to produce the paired scan lines of each group in the scan pattern. However, due to manufacturing tolerances the individual faces in each group of faces of the polygon are typically slightly skewed with respect to one another, whereupon the scan lines forming each pair of groups are not coincident. Thus, in practice each pair of lines of each group actually comprises plural closely spaced parallel lines as shown in FIGS. 5-7. In particular in a commercial embodiment of the invention, the group 34A is made up of a pair of subgroups 34A1 and 34A2, the group 34B is made up of a pair of subgroups 34B1 and 34B2, and the group 34C is made up of a pair of subgroups 34C1 and 34C2. Each subgroup is in turn composed of plural, e.g., four, parallely disposed closely spaced scan lines 36. The spacing between the individual scan lines making up each subgroup is a result of the manufacturing tolerances and is much less than the spacing between the subgroups of the pairs defining each group. In accordance with the preferred embodiment of this invention and the spacing between the subgroups themselves of each group is approximately 6 mm, for reasons to be described later.

As can be seen in FIG. 6, the scan pattern 34 which is produced in a plane at approximately 45° to the window the scanning pattern 34 is of a generally symmetrical star-burst shape, with the groups 34A, 34B and 34C intersecting in a common area, and with the groups disposed at approximately 60° to one another. The pattern 34 which is produced in a plane approximately 90° to the window (and as shown in FIG. 5), is of a generally equilateral triangular shape formed by the intersection of the groups 34A, 34B and 34C with one another The pattern 34 produced in the plane of the window or parallel thereto, (as shown in FIG. 7), is also triangular in shape but somewhat elongated, that is, the sides formed by groups 348 and 34C are each longer than the side formed by group 34A.

It should be apparent to those skilled in the art, the shape of the scan pattern 34 in the planes other than 90°, 45° and 0° will be different than that shown in FIGS. 5, 6 and 7, respectively. Thus, the pattern 34 created between the 45° and 90° planes will become triangular in shape as the angle of the plane increases up to 90°. Similarly, the pattern also becomes triangular in shape as the angle of the plane decreases from 45° down to 0°.

As mentioned earlier, notwithstanding the compact nature of the scanner 20 it produces a relatively large volume ("sweet spot") scanning pattern 32 above the window. In particular the sweet spot includes a sufficient number of intersecting scan lines passing therethrough to ensure that an entire bar code placed therein is traversed completely by one or more portions of the pattern. This action ensures the quick, accurate and precise reading of the bar code, and without requiring the operator to precisely place or orient the article bearing the code to a precise position with respect to the scanning pattern. Moreover, by use of a scan pattern including paired scan lines spaced by a minimum distance the scanner 20 can use a relatively high powered laser tube to gain the benefits of increased sensitivity and noise resistance, without exceeding applicable government regulations regarding radiation. In particular utilizing a spacing of approximately 6 mm between the paired lines forming each group of the pattern, one can use a 400 microwatt laser tube and still be within the Food and Drug Administration's CDRH requirements for a Class IIA laser device.

Figure 4:
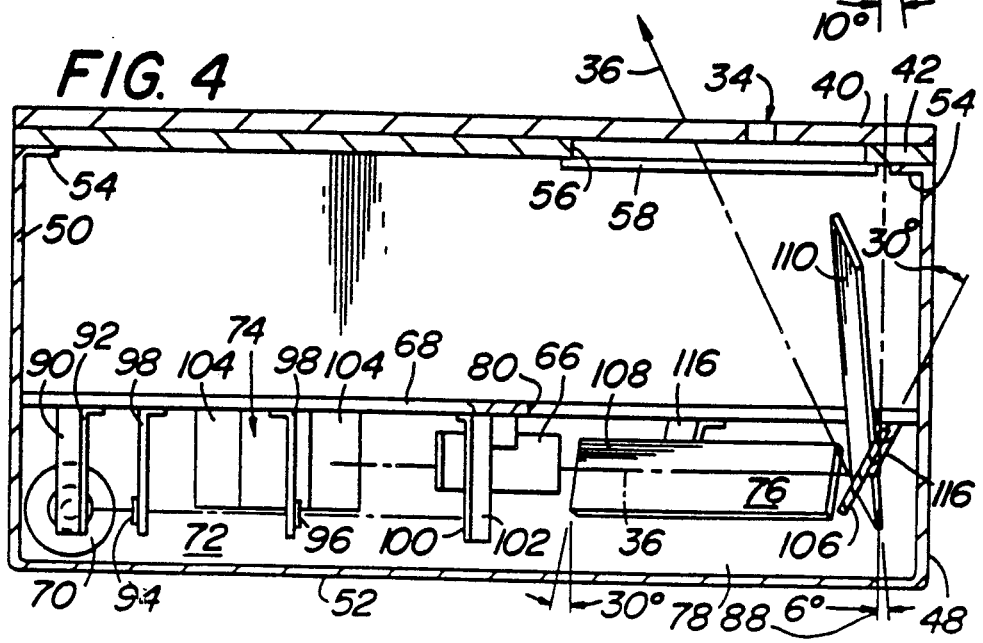
FIG. 4 is a sectional view taken along line 4—4 of FIG. 3.

Referring now to FIGS. 2-4, the details of the construction of the scanner 20 will now be described. However, before going into that description, it should be pointed out that the device 20 also includes additional components and means, none of which are shown, for receiving the light reflected off the scanned bar code, for producing electrical signals indicative thereof, and for processing those signals to produce electrical output signals, e.g., ASCII code, for use by associated peripheral equipment, such as electronic cash registers, computers, etc.

Turning now to FIGS. 2-4, it can be seen that the housing 30 is of regular shape, e.g., a parallelopiped, and basically comprises a top wall 38 formed by a pair of planar plates 40 and 42, a pair of planar sidewalls 44 (FIG. 3) and 46, a pair of planar end walls 48 and 50 (FIG. 3) and a planar bottom wall 52 (FIG. 4). The sidewalls, end wall and bottom wall are all of generally triangular shape, and are formed as an integral unit. The top edge of the sidewalls and end walls are in the form of an inwardly directed flange 54 (FIG. 4). This flange serves as a mount for the plate 42. Thus, the plate is releasably secured to the flange 54 by means (not shown). As shown clearly in FIG. 4 the plate 44 includes a rectangular opening 56 which serves as a window for the housing. A transparent pane 58 is mounted under the window to close the interior of the housing from the ambient atmosphere. The plate 40 is secured on top of the plate 42 and includes three intersecting slots 60, 62 and 64 which are disposed directly over the opening 56. These slots collectively define the scan pattern window 32 discussed heretofore. To that end, the slots 60, 62 and 64 are oriented with respect to one another in the same manner as the scan line groups 34A, 34B and 34C. As so oriented, slot 60 enables the scan lines 36 forming the scan line group 34A to exit the housing 30 therefrom, while slots 62 and 64 enable the scan lines forming the groups 34B and 34C, respectively, to exit the housing therefrom, thereby producing the complete scan pattern 34 in the space above the window.

As is conventional, light reflected off the bar code held within the scanning pattern is enabled to pass back through the window 34 and into interior of the housing This reflected light is collected by a beam collecting mirror 66. That mirror directs the reflected light to associated sensing and signal processing means (not shown) to effect the decoding of the symbol.

The scan pattern 34 is produced by sweeping a sharply defined laser beam across various optical components located within the housing 30. These components serve to fold the beam into the desired orientations to form the lines 36 making up the pattern. The means for producing the beam, focusing it, sweeping it through the housing, folding it and directing it out of the housing's window are all mounted on an optic bench 68 located within the lower portion of the housing 30. Those components will be described in detail later. Suffice it for now to state that those components basically comprise a laser tube 70, beam focusing and directing means 72, a beam sweeping mechanism, such as a multi-faceted rotating reflecting member 74, and beam-folding reflective members 76.

The optic bench 68, as clearly seen in FIGS. 2 and 4, is a generally rectangular, plate-like member which is mounted within the housing 30 parallel to the bottom wall 52. The member 68 supports the pattern forming components 70, 72, 74 an 76 in a space 78 located between it and the bottom wall 52. The member 68 also includes a large rectangular opening or window 80 adjacent the forward end and through which the swept laser beam 36 passes.

The laser tube 70 is of a conventional steel sheathed-ceramic construction and is mounted parallel to a transverse axis 84 of the housing. The transverse axis 84 extends through slot 60 forming a portion of the beam exit window 34 and is also perpendicular to a horizontal, longitudinal, central axis 86. The axis 86 bisects the angle formed by the two slots 62 and 64 of the window 32. A vertical axis 88 (FIG. 4) extends perpendicularly to both axes 84 and 86. The laser tube 70 is arranged when provided with electric current from means (not shown) to produce a coherent beam of light This light beam is directed out of a lens located at the end 82 of the laser tube. The existing laser beam impinges on a mirror 90 disposed adjacent to the end 82 of the tube 70. That mirror is mounted on the optic bench by a bracket 92 and is oriented at an angle of approximately 45° to the longitudinal axis 86, whereupon the laser beam is directed off the mirror 90 and down a path parallel to the axis 86 immediately adjacent to sidewall 46 (FIG. 3). The beam then passes through a pair of lenses 94 and 96 mounted on the optic bench, via respective mounting brackets 98. The lens 94 serves to focus the beam into a sharp, clearly, defined circle The lens 96 serves to enlarge the circular beam to the desired cross sectional area. The now properly sized beam passes to a second mirror 100 mounted on the optic bench via a bracket 102. The mirror 100 extends at an acute angle to the axis 86 to direct the laser beam to the multi-faceted reflecting member 74.

The beam sweeping device is shown as multi-faceted reflecting member 74 and basically comprises a mirrored polygon which is arranged to be rotated by motor means (not shown) about a vertical axis parallel to axis 88. It must be pointed out at this juncture other beam sweeping devices could be used, such as an oscillating mirror, in lieu of the rotating polygon. In the embodiment shown herein the polygon 74 is an octagon, with each of its eight faces 104 being a planar, mirrored reflecting surface As can be seen in FIG. 3 the eight faces 104 each extend at the same angle to one another when measured in a horizontal plane. However, the faces are alternately grouped so that one group is skewed at a slightly different very small angle with respect to the alternate group when measured from the vertical axis. The skewed orientation of the alternating faces of the two groups creates the paired subgroupings with the desired 6 mm spacing therebetween as described heretofore.

As will be appreciated by those skilled in the art, the movement of each face 104 about the vertical axis around which the polygon 74 rotates causes the beam reflecting thereof to sweep linearly to create a scan line 36. The scan line 36 is directed to the mirrored reflecting surfaces 76 which serve to fold the swept line and direct it out through the window 32 in the desire orientation to form a portion of the scan pattern 34.

The details of the reflecting means 76 will now be described. As can be seen, the reflecting means 76 basically comprises a first reflecting surface 106, a pair of second reflecting surfaces 108 and 110, and a pair of third reflecting surfaces 112 and 114. All of the reflecting surfaces are elongated planar mirrors and are mounted on the optical bench immediately adjacent the window, 80 via respective mounting brackets 116.

As can be seen clearly in FIGS. 3 and 4, the mirrored reflecting surface 106 is mounted so that its longitudinal axis is parallel to the heretofore described transverse axis 84, while being basically centered with respect to the heretofore described longitudinal axis 86. The mirror 106 is angled upward at an angle of approximately 30° to the vertical axis The mirror 108 is mounted so that it extends at approximately 10° to the longitudinal axis 86 (See FIG. 3) while being angled upward at approximately 30° with respect to vertical axis 88 (See FIG. 4). The mirror 112 is constructed identically to mirror 108 and is disposed opposite thereto but oriented as a mirror image with respect to the mirror 108. Accordingly, mirror 112 also extends at an angle of approximately 10° to the longitudinal axis 86, while being tilted upward at an angle of approximately 30° to the vertical axis 88. The mirror 110 is mounted laterally of the mirror 106 and with a major portion thereof extending above mirror 106 and through window 80 in the optic bench 68. The mirror 110 is tilted backward with respect to the vertical axis at an angle of approximately 6° (See FIG. 4) while being tilted at approximately 10° with respect to the transverse axis 84. The longitudinal axis of the mirror 110 extends at an angle of approximately 30° to the vertical axis 88. The mirror 114 is constructed identically to mirror 110 and is disposed opposite thereto but oriented as a mirror image with respect to mirror 110 so that it extends at an angle of approximately 6° with respect to the vertical axis and 10° with respect to the transverse axis, while its longitudinal axis extends at approximately 30° to the vertical axis.

The angled mirrors 108 and 110 form the scan lines 36 making up group 34B. To that end, the rotation of the polygon 74 causes the beam 36 to sweep down the length of the mirror 108 from a point closest to the polygon 74 to a point furthest from the polygon. That beam reflects off mirror 108 onto mirror 110 which serves to fold the beam and direct it out through slot 62 of window 32, thereby forming one line 36 of the group 34B. After the beam 36 sweeps off the end of mirror 108 furthest from the polygon, it sweeps onto mirror 106 at a point closest to mirror 108. The beam then sweeps across, that is, down the length of the mirror 106. The angled orientation of the mirror 106 directs the beam 36 upward and out through slot 60 of the window 32 to form one scan line of group 34A. After the beam sweeps off mirror 106 it then begins sweeping across mirror 112 from a point furthest from the polygon to a point closest to the polygon. This beam section is then reflected off of mirror 112 onto mirror 114 and out through slot 64 to form one scan line 36 of the group 34C.

The foregoing scanning process is carried out by the rotation of a single face of the polygon 74 about its axis to produce a single scan line 36 in each of the sections 34A, 34B and 34C. The next polygon face 104 upon which the beam from mirror 100 is directed creates the next scan line 36 of each of the groups of the pattern. Owing to the fact that the faces of the polygon are in the skewed groups, as described previously, the next succeeding line 36 of the pattern is spaced from the previous line by approximately 6 mm.

In order to expedite the scanning process, that is to maximize what is referred to in the art at the "first pass read rate", the top plate 40 forming the top 38 of the housing 30 includes guide indicia 200 thereon. The indicia is provided to help direct operating personnel move the bar code to be scanned into the sweet spot of the scanning pattern. To that end the indicia comprises a sylized arrow 202 including bar code 204 located between a parallel pair of guide lines 206 and 208. The guide lines 206 and 208 extend parallel to the longitudinal axis 86 toward the slots 62 and 64 respectively. Thus, as shown in FIG. 1 the operator orients the package 24 bearing the bar code 26 so that the code is pointed somewhat downward and toward the sylized bar code 204 on the scanner 20 and then moves the package in the direction of the arrow 202 between the guide lines 206 and 208 over the window 32.

As should be appreciated from the foregoing, the scanner of the subject invention is a miniaturized and compact device suitable for high performance use in counter mounted applications. In particular, the scanner is of considerable utility in medium volume retail environments, such as in drug and convenience stores, and medium volume food markets. Owing to the advanced optical design and simplified mechanics, the device provides powerful scanning capabilities in an inexpensive, compact scanning system. In particular the scanner is housed within a spacesaving, lightweight unit making installation convenient and inexpensive. Moreover, the unit can be installed in existing counters without expensive remodeling and is suitable for removal from the counter in minutes for servicing. The scanner features flush mounting and a gateless construction to accommodate bulky or flat merchandise and to maximize counter surface The short height, e.g., six inches or less, leaves ample legroom for seated point-of-sales stations and storage The scan pattern created by the unit permits six inches wide scanning and a six-inch depth of field. Moreover owing to the short height of the scanner, it can be utilized directly on top of a counter in some applications, e.g., in applications where there is no space at all below the counter.

The scanner 20 may be positioned beneath the counter, or on top of the counter (as described earlier), so that its window is horizontal or vertical, by mounting it directly on either of its planar end walls 48 and 50, either of its planar side walls 44 and 46, or on its bottom wall 52. The scanner may also be mounted via means, e.g., a panel (not shown), above, below or adjacent the counter. The housing is arranged to be mounted so that the window can be in any plane at any angle to the counter This omnidirectional mounting ability is achieved readily in the preferred embodiment since housing 30 comprises a regularly shaped parallelopiped having planar walls devoid of projecting elements or protuberances. Thus, the lightweight, compact form of the scanner 20 enables a variety of positioning options without mechanical distortion of the laser beam path or vibration problems.

Figure 8A:
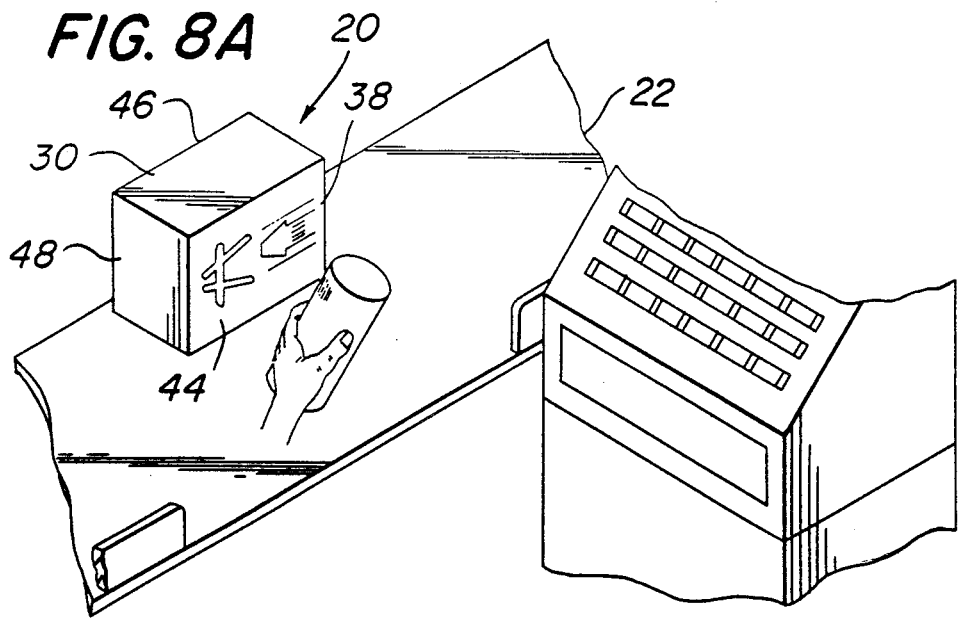
FIG. 8A is a perspective view showing the laser scanner apparatus of the subject invention mounted directly on one of its side walls, positioned on top of the checkout counter.
Figure 8B:
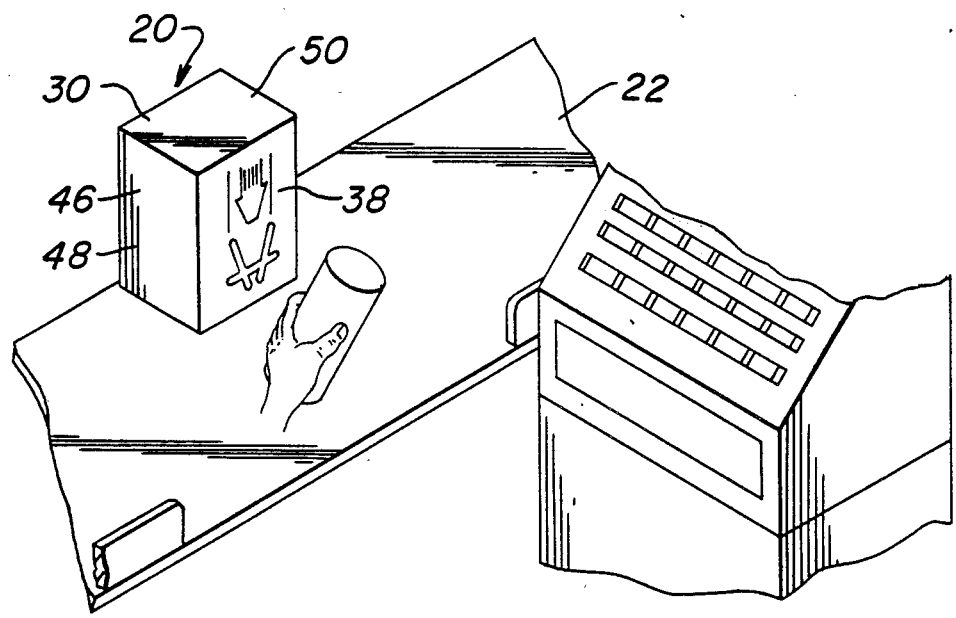
FIG. 8B is a perspective view of the laser scanner apparatus of the subject invention mounted directly on one of its end walls, positioned on top of the checkout counter.
Figure 8C:
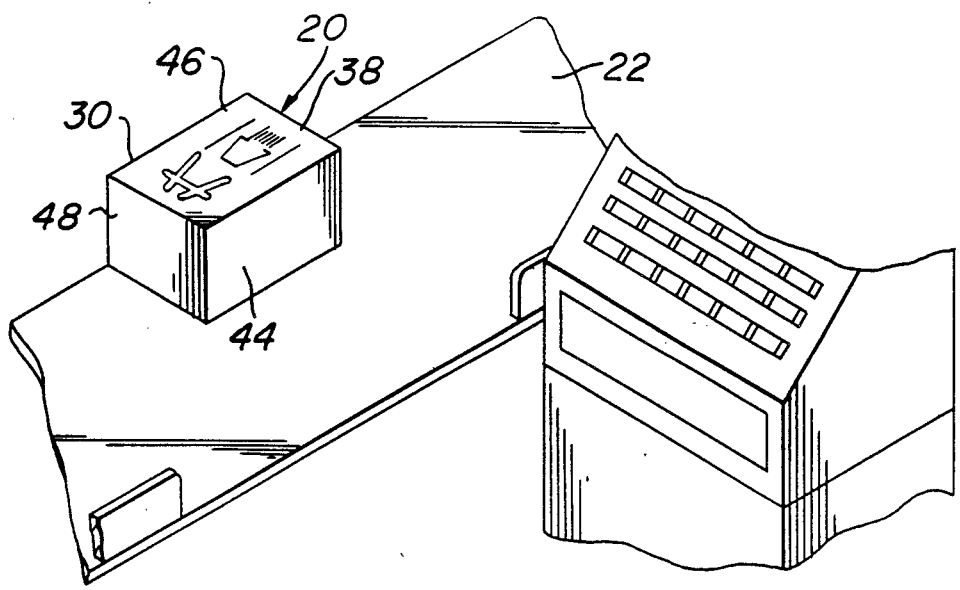
FIG. 8C is a perspective view of the laser scanner apparatus of the subject invention mounted directly on its bottom wall, positioned on top of the checkout counter.

FIGS. 8A, 8B, and 8C how the scanner 20 positioned on top of the counter 22. In FIG. 8A, the scanner 20 is mounted on one of its side walls 44 on top of the counter 22. The planar top wall 38 of the housing is perpendicular to the plane of the counter. FIG. 8B shows the scanner mounted on open of its end walls on top of the counter 22. FIG. 8C shows the scanner 20 mounted on its bottom wall on top of the counter 22.

Further, the excellent scanning patterns obtained onto planes at all angles between those parallel and those perpendicular to window 32 allow for reliable scanning with scanner 20 positioned horizontally, or vertically, or at angles in between, on any of its walls. This feature is particularly important in cases of insufficient space below the counter for the clerk to sit when scanner 20 is positioned beneath the counter. Thus, scanner 20 may be positioned on any of its walls on top of the counter or on a panel above and adjacent to the counter, or in an area between counters In the preferred embodiment of the invention the scanner requires less than 30 watts of power and generates considerably less heat than comparable scanners Without further elaboration, the foregoing will so fully illustrate my invention that others may, by applying current or future knowledge, readily adopt the same for use under various conditions of service

I claim:

1. A compact laser scanner positioned on top of a horizontally disposed scanner counter, said scanner producing a scanning pattern into which a bar code can be inserted to enable the reading of said code, said scanner comprising:
   a. a housing with a plurality of planar side walls and planar end walls, a planar bottom wall and a planar top wall, said top wall having a light transmissive opening, said scanner being directly mounted on one of said side walls on top of said counter;
   b. a laser beam generating means, disposed within said housing, for producing a laser beam,
   c. a beam sweeping means, disposed within said housing, for cyclically sweeping said beam;
   d. a reflective means disposed within said housing for projecting said beam outside of said housing, said beam sweeping means and said reflecting means being oriented so that for each sweep of said beam, said reflecting means projects an intersecting line scanning pattern out of said light transmissive opening.

2. The scanner of claim 1 wherein the distance between the said top wall and said bottom wall is 6 inches or less.

3. The scanner of claim 2 wherein said bottom wall area is approximately 150 square inches or less.

4. The scanner of claim 3 wherein said scanner is in the shape of a rectangular parallelepiped.

5. A method for scanning a bar code at a checkout counter comprising the steps of:
   a. providing a housing;
   b. positioning said housing directly on top of said counter;
   c. generating a laser beam within said housing;
   d. cyclically sweeping said beam within said housing to produce a scanning pattern;
   e. projecting said scanning pattern outside of said housing; and
   f. passing said bar code through said scanning pattern.

6. The method of claim 5 wherein said housing comprises side walls, end walls, a bottom wall, and a top wall with an opening; said projecting step comprises projecting said scanner pattern through said opening; and said positioning step comprises mounting said housing directly on open of its side walls on top of said counter.

7. The method of claim 6 wherein said positioning step comprises mounting said housing directly on open of its end walls on top of said counter.

8. The method of claim 7 wherein said positioning step comprises mounting said housing directly on its bottom wall on top of said counter.

* * * * *